United States Patent
Diamond et al.

(10) Patent No.: US 7,095,757 B2
(45) Date of Patent: Aug. 22, 2006

(54) SYSTEM AND METHOD FOR OPTIMIZING TERRESTRIAL SIGNAL ACQUISITION IN A COMMUNICATION SYSTEM

(75) Inventors: Harry Diamond, Tipton, IN (US); Douglas A. Cramer, Kokomo, IN (US); Glenn A Walker, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 890 days.

(21) Appl. No.: 10/235,424

(22) Filed: Sep. 5, 2002

(65) Prior Publication Data

US 2005/0254525 A1 Nov. 17, 2005

(51) Int. Cl.
*H04J 3/06* (2006.01)
(52) U.S. Cl. ..................................................... 370/503
(58) Field of Classification Search ............... None
See application file for complete search history.

(56) References Cited

U.S. PATENT DOCUMENTS

| | | | |
|---|---|---|---|
| 5,627,547 A | 5/1997 | Ramaswamy et al. | |
| 5,774,828 A | 6/1998 | Brunts et al. | |
| 5,864,579 A * | 1/1999 | Briskman | 375/130 |
| 5,887,269 A | 3/1999 | Brunts et al. | |
| 5,964,821 A | 10/1999 | Brunts et al. | |
| 6,570,486 B1 | 5/2003 | Simon et al. | |
| 6,745,017 B1 * | 6/2004 | Meehan | 455/277.1 |
| 6,763,229 B1 * | 7/2004 | Meehan | 455/277.1 |
| 6,798,791 B1 * | 9/2004 | Riazi et al. | 370/515 |
| 6,944,139 B1 * | 9/2005 | Campanella | 370/315 |
| 2003/0108135 A1 * | 6/2003 | Frigon | 375/354 |
| 2003/0117940 A1 * | 6/2003 | Smallcomb | 370/208 |

* cited by examiner

*Primary Examiner*—Chi Pham
*Assistant Examiner*—Anh-Vu Ly
(74) *Attorney, Agent, or Firm*—Stefan V. Chmielewski

(57) ABSTRACT

A system optimizes terrestrial signal acquisition in a communication system by initially determining whether a first synchronization signal is available from a first ensemble, which has an associated first programmed content of a terrestrial signal. Next, when the first synchronization signal is not available from the first ensemble, the system switches to a second ensemble of the terrestrial signal to acquire a second synchronization signal, which is synchronized with the first synchronization signal. Finally, the system switches back to the first ensemble to retrieve the associated first programmed content.

7 Claims, 2 Drawing Sheets

SYSTEM AND METHOD FOR OPTIMIZING TERRESTRIAL SIGNAL ACQUISITION IN A COMMUNICATION SYSTEM

TECHNICAL FIELD

The present invention is generally directed to a communication system and, more specifically, to optimizing terrestrial signal acquisition in a communication system.

BACKGROUND OF THE INVENTION

Satellite digital audio radio service (SDARS) is a relatively new satellite-based service that broadcasts audio entertainment to fixed and mobile receivers within the continental United States and potentially in various other parts of the world. Within an SDARS system, satellite-based transmissions provide the primary means of communication. However, certain urban settings may require a terrestrial transmission link to provide continuity of service, when satellite coverage is compromised due to the presence of obstructions. Reception of signals in the presence of objects, such as buildings, bridges, automobiles, etc., can distort a received signal even when the objects are not in the line-of-sight between a transmitter and a receiver. That is, signal rays reflecting off of various objects can sum constructively or destructively to produce interference patterns in the spectrum of a received signal. These distortion patterns, also known as multipath interference, can cause distortion in a demodulated signal.

In the case of digital communication systems, multipath interference may cause errors in a received data stream. While error correction coding can reduce the impact of multipath interference, critical portions of the received signal are often less robust and their preservation is required for successful recovery of the received signal. For example, a synchronization signal may require detection to allow data stream recovery. However, when multipath fading occurs and the synchronization signal is obscured, an earth-based receiver may not be able to synchronize with a satellite and/or a terrestrial ground station and, as such, the earth-based receiver cannot acquire a desired received signal.

In an effort to reduce the effect of multipath interference, at least some earth-based receivers have incorporated spatial diversity. That is, some earth-based receivers have incorporated separate satellite and terrestrial antennas, which optimize the reception of both the satellite and terrestrial components of the broadcast service. Due to the physical separation and difference in the antenna patterns and phase centers of the satellite and terrestrial antennas, spatially diverse versions of a desired received signal may be acquired. As such, if a desired received signal suffers impairment and its synchronization signal is unrecoverable, a different version of the signal from which the synchronization signal can be recovered may be obtained by use of a switching element that is internal to a given receiver. For example, the receiver may switch from the terrestrial antenna to the satellite antenna to receive a different version of the terrestrial signal, which is sufficiently unimpaired to allow signal recovery.

One SDARS system is expected to provide approximately one-hundred channels of music, news, sports, ethnic, children's and talk entertainment on a subscription-based service and may include other services, such as email and data delivery. In this system, the program material is transmitted from a ground station to two satellites that orbit over the continental United States in a geo-stationary orbit. This system also includes a number of terrestrial repeaters in large cities, where multipath interference is prevalent.

In various SDARS systems, a synchronization signal, contained within a received signal, is typically utilized by an earth-based receiver to determine the starting point for digital data framing. In systems that have a terrestrial bandwidth that includes multiple ensembles, each ensemble may include a narrowband synchronization signal that is susceptible to loss due to selective fading at the synchronism frequency. Due to the design of a typical SDARS earth-based receiver, once the synchronization signal is acquired, the receiver can sustain synchronization outages due to the fact that the receiver is capable of sustaining synchronization without the synchronization signal.

Thus, when a SDARS earth-based receiver initially receives a synchronization signal it attempts synchronization acquisition or lock. However, if an earth-based receiver cannot lock onto a synchronization signal, then it cannot receive such an SDARS broadcast. It should be appreciated that a mobile earth-based receiver may periodically experience nulls in the synchronization signal, due to the nature of multipath interference. These nulls, in general, do not interfere with the ability of the receiver to receive broadcast programming. After initial synchronism lock, frequent availability of the synchronism signal is largely unnecessary. However, should the mobile earth-based receiver stop in a null location or if a fixed earth-based receiver is located in a null location, then the earth-based receiver may not be able to initially acquire the synchronization signal from a start-up condition and, therefore, the receiver cannot obtain and provide such SDARS programmed content to a listener.

What is needed is an earth-based receiver that is capable of receiving programmed content even when the earth-based receiver is located such that its antenna experiences a null at a given frequency, which corresponds to the frequency of a synchronism signal.

SUMMARY OF THE INVENTION

The present invention is directed to a method and system for optimizing terrestrial signal acquisition in a communication system. Initially, the system determines whether a first synchronization signal is available from a first ensemble of a terrestrial signal, which has an associated first programmed content. Next, when the first synchronization signal is not available from the first ensemble, the system switches to a second ensemble of the terrestrial signal to acquire a second synchronization signal, which is synchronized with the first synchronization signal. Finally, the system switches back to the first ensemble to retrieve the associated first programmed content from the first ensemble.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENT(S)

Figure 1:
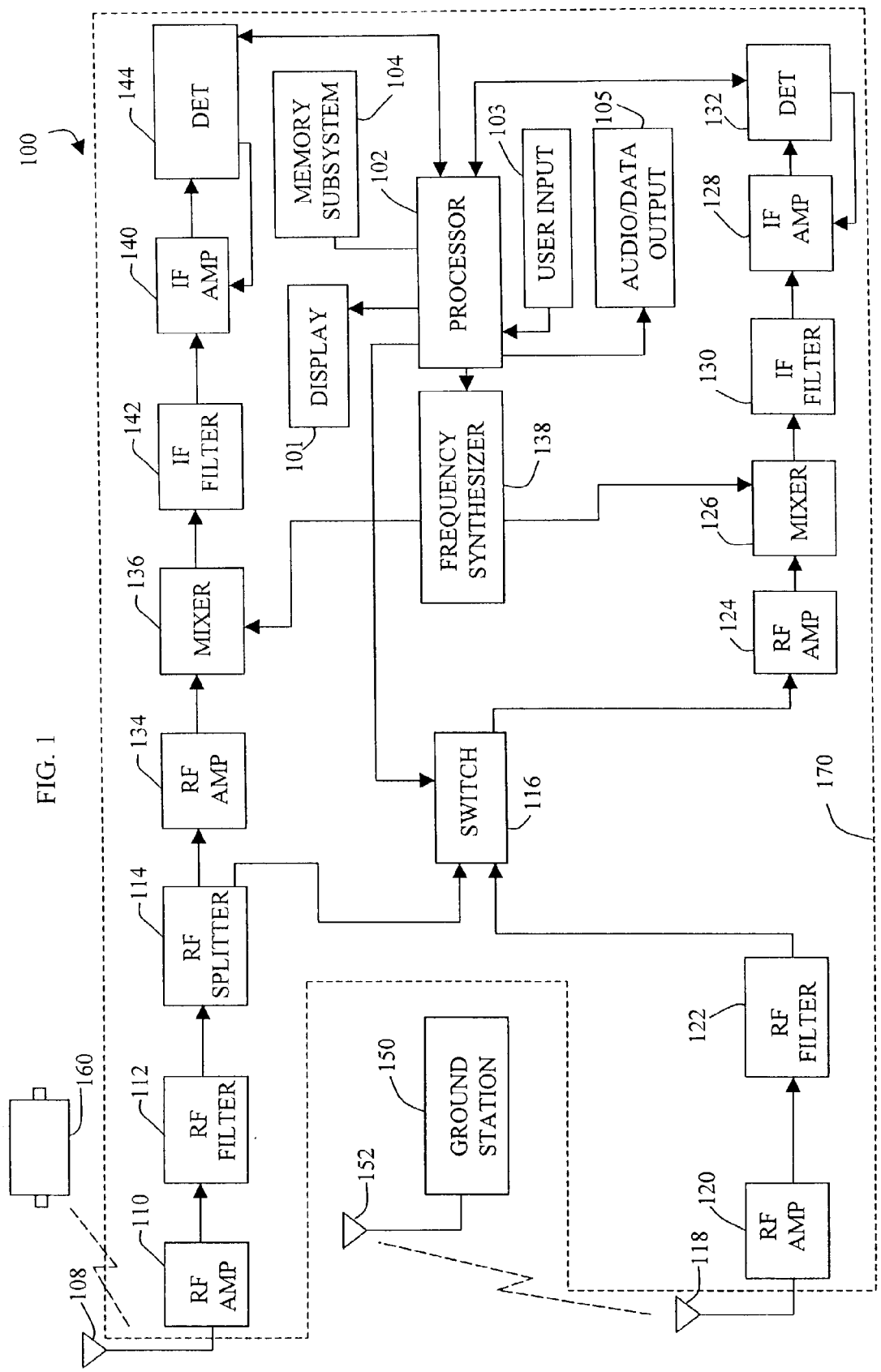
FIG. 1 is a block diagram of relevant portions of an exemplary satellite digital audio radio service (SDARS) system.

The present invention is directed to a system and method for optimizing terrestrial signal acquisition in a communication system. According to the present invention, a terrestrial signal includes a first ensemble and a second ensemble with each ensemble having associated programmed content and a synchronization signal. The synchronization signals are coherent with one another such that either synchronization signal can be used by a receiver to lock onto programmed content of either ensemble. That is, if the synchronization signal associated with the first ensemble is not available, the system attempts to acquire the second synchronization signal so as to acquire the programmed content associated with the first ensemble.

It should be appreciated that the present invention is generally applicable to any communication system that implements multiple ensembles that each have synchronization signals that are coherent. Due to the selective nature of multipath interference, the likelihood of encountering simultaneous fades of multiple synchronization signals, which are separated in frequency, is greatly reduced from what it would be for a single synchronization signal, as signal fades between ensembles are largely uncorrelated with one another in the frequency domain.

The advantages of the frequency diversity approach, over an approach based solely on spatial diversity, is that the frequency diversity approach can be readily implemented within software reducing the need for additional switching hardware, which can reduce required printed circuit board (PCB) area, as well as the cost of an earth-based receiver. Thus, compromises to the signal path are lessened due to the reduction of interconnecting hardware. Furthermore, compromises such as the deterioration of signal quality, reduced inter-path isolation and the need for gain matching between paths (when a single wideband automatic gain control (AGC) detection circuit is used at the output of the switch) may be reduced or avoided. It should be appreciated that an imbalance in gain can cause the AGC to toggle in value as the position of a diversity switch is toggled potentially altering received signal performance. Further, such a frequency diverse system can be implemented within a spatially diverse system, with associated greater cost, to achieve even greater diversity.

In a typical implementation, the system checks for availability of the satellite and terrestrial signals upon power-up and if the satellite signal is available and the terrestrial signal is not, the system utilizes the satellite signal. It should be appreciated that movement of an earth-based receiver, from the start-up position, may necessitate the need for terrestrial back-up of the satellite, but such motion also provides variation in the multipath signal yielding a form of diversity without the need for a change in acquisition technique. If at start-up a satellite signal is not available and narrowband AGC indicates the presence of a terrestrial signal, the system attempts to acquire the terrestrial signal, while switching from one ensemble to another ensemble in an attempt to lock onto a synchronization signal.

The requirement for detecting terrestrial energy keeps the receiver from switching ensembles unnecessarily when no terrestrial energy is available from which to obtain a synchronization signal (i.e., satellite only locations). If a lock is achieved on one of the terrestrial-based synchronization signals, the demodulators may be free run and the system can switch back to a desired ensemble and unmute the audio of a desired program channel, when demodulation and decoding of the desired signal is complete.

FIG. 1 depicts a block diagram of the relevant portions of an exemplary satellite digital audio radio service (SDARS) system 100, configured according to an embodiment of the present invention. As shown in FIG. 1, the system 100 includes an SDARS receiver 170 that is capable of receiving signals from a satellite 160 and a ground station or terrestrial repeater 150, which transmits programming redundant to the satellite 160.

The signal transmitted from the terrestrial repeater 150 may be received by the receiver 170, via antenna 118. Similarly, the satellite signal provided by the satellite 160 may be received by the receiver 170, via satellite antenna 108, which is coupled to a radio frequency (RF) amplifier 110. The RF amplifier 110 is coupled to an RF filter 112, which is coupled to an RF splitter 114. An output of the RF splitter 114 is coupled to an input of an RF amplifier 134 and an input of a diversity switch 116. The antenna 118, which receives terrestrial signals is coupled to an RF amplifier 120, which is coupled to an RF filter 122, whose output is coupled to an input of the switch 116.

A processor 102 controls the switch 116 based upon received detected signal levels associated with a terrestrial signal. That is, the processor 102 may control the switch 116 such that either antenna 108 or antenna 118 can provide an output signal to the input of the RF amplifier 124 and, thus, provide spatial diversity for the lower signal path of the receiver 170, which serves the terrestrial segment. The RF amplifier 124 provides the received signal to a mixer 126, whose output is controlled by the processor 102, via frequency synthesizer 138.

That is, the processor 102, by varying the frequency provided by the frequency synthesizer 138, sweeps the receiver 170 across a range of frequencies such that the receiver 170 can receive programmed content from one or more ensembles. An output of the mixer 126 is coupled to an input of an intermediate frequency (IF) filter 130, whose output is coupled to an input of an IF amplifier 128, which provides an amplified received signal to an input of a detector 132. The detector 132 may include an automatic gain control (AGC) circuit, which controls the gain of the IF amplifier 128, based upon a level of the received signal. As shown, the detector 132 also provides an indication of the signal level to the processor 102, which may control the frequency of the signal provided by the frequency synthesizer 138 based upon the output of the detector 132.

The frequency synthesizer 138 is also coupled to a mixer 136, which receives a satellite signal from the RF amplifier 134. An output of the mixer 136 is coupled to an input of an IF filter 142, whose output is coupled to an input of an IF amplifier 140, which provides a received amplified signal to an input of detector 144. The detector 144, similar to the detector 132, may include an automatic gain control (AGC) circuit, which controls the gain of the IF amplifier 140, and may provide an indication of the signal level to an input of the processor 102. In this manner, the processor 102 can determine, from the output of the detectors 132 or 144, whether a satellite signal or a terrestrial signal are available, or a combination thereof.

When the satellite signal is not available, due to, for example, physical obstructions, the processor 102 continues to attempt to lock onto a terrestrial signal to receive the desired programmed content. According to the present invention, the processor 102 may change from a first ensemble, which contains a desired programmed content, to a second ensemble to retrieve a synchronization signal associated with the second ensemble when the synchronization signal associated with the first ensemble is not available. Providing the processor 102 can lock onto the second synchronization signal of the second ensemble, the processor 102 then returns to the first ensemble to retrieve the desired programmed content. As previously discussed, the ability to shift from a first ensemble to a second ensemble to retrieve a coherent synchronization signal provides frequency diversity for the system in that the synchronization signal associated with the second ensemble can be utilized by the receiver to lock onto the desired programmed content in the first ensemble when the first synchronization signal is not available due to, for example, multipath interference.

Figure 2:
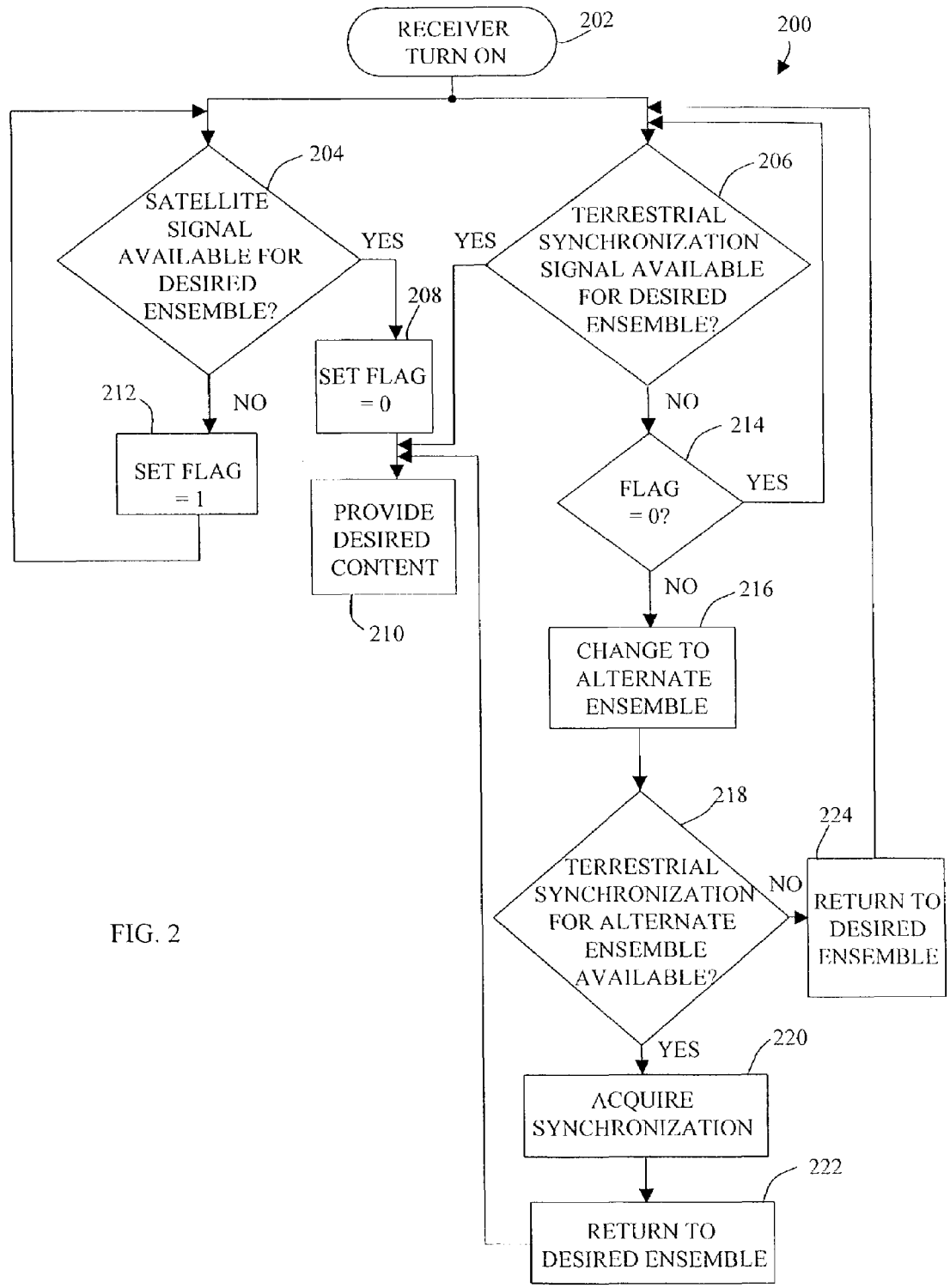
FIG. 2 is a flow diagram of an exemplary diversity routine implemented by a processor associated with a receiver of the SDARS system of FIG. 1.

FIG. 2 illustrates an exemplary diversity routine 200, implemented by the processor 102 of the receiver 170, which implements frequency diversity. In step 202, the routine 200 is initiated at power-up of the receiver 170, at which point control simultaneously transfers to decision steps 204 and 206. In step 204, the processor 102 determines, from the output of the detector 144, whether the satellite signal is available for the desired ensemble. If so, control transfers from step 204 to step 208, where a satellite flag is cleared to indicate that the satellite signal is available, at which point control transfers to step 210, where the receiver 170 provides the desired content to a listener. In step 204, when the satellite signal is not available for the desired ensemble, e.g., multipath interference is preventing the receiver 170 from receiving the satellite signal, control transfers to step 212, where the satellite flag is set to one to indicate the satellite signal is not available.

In step 206, the processor 102 determines whether the terrestrial synchronization signal is available for the desired ensemble. If so, control transfers from step 206 to step 210, where the receiver 170 provides the desired content to a listener. Otherwise, control transfers from step 206 to decision step 214, where the processor 102 determines whether the satellite flag is clear, indicating the satellite signal is available. If the satellite flag is clear, control transfers from step 214 back to step 206.

When the satellite flag is set or not clear, indicating the satellite signal is not available, the processor 102 causes control to transfer from step 214 to step 216, where the receiver 170 is tuned to an alternate ensemble in an attempt to obtain a synchronization signal. For example, if the desired programmed content is associated with a second ensemble and a second synchronization signal associated with the second ensemble is not available, the processor 102 causes the receiver 170 to tune across a frequency range of a first ensemble in an attempt to lock onto a first synchronization signal associated with the first ensemble. Thus, in step 216, the processor 102, implementing the routine 200, changes to an alternate ensemble when the synchronization signal associated with the desired ensemble is not available.

Next, in decision step 218, the processor 102 determines whether the terrestrial synchronization signal is available for the alternate ensemble. If not, control transfers to step 224 and then to step 206. Otherwise, control transfers from step 218 to step 220, where the processor 102 causes the receiver 170 to acquire synchronization. Then, in step 222, the processor 102 causes the receiver 170 to return to the desired ensemble such that the desired programmed content can be retrieved and provided to a listener in step 210.

Accordingly, a system and method have been described herein which allow a receiver to obtain a synchronization signal from an ensemble that is not associated with a desired programmed content. Upon receiving the synchronization signal, the receiver then returns to the desired ensemble to provide a desired programmed content to a listener. The implementation of such a receiver is particularly advantageous in fixed applications and in mobile environments, e.g., an automotive environment, when an associated motor vehicle is stopped at a synchronization signal null.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. A method to optimize terrestrial signal acquisition in a communication system, comprising the steps of:
   determining whether a first synchronization signal is available from a first ensemble of a terrestrial signal, wherein the first ensemble has an associated first programmed content;
   switching to a second ensemble of the terrestrial signal to acquire a second synchronization signal when the first synchronization signal is not available from the first ensemble, wherein the second ensemble has an associated second programmed content, wherein the first programmed content is different from the second programmed content, and wherein the first synchronization signal is synchronized with the second synchronization signal; and
   switching back to the first ensemble to retrieve the associated first programmed content from the first ensemble.

2. The method of claim 1, wherein the communication system is a satellite digital audio radio service (SDARS) system.

3. The method of claim 1, wherein the first and second synchronization signals are narrowband signals.

4. A satellite radio receiver that optimizes terrestrial signal acquisition, the receiver comprising:
   an antenna to receive a terrestrial signal;
   a tuner coupled to the antenna; and
   a processor coupled to a frequency synthesizer of the tuner, wherein the processor is programmed to perform the steps of:
      determining whether a first synchronization signal is available from a first ensemble of the terrestrial signal, wherein the first ensemble has an associated first programmed content;
      switching the tuner to a second ensemble of the terrestrial signal to acquire a second synchronization signal when the first synchronization signal is not available from the first ensemble, wherein the second ensemble has an associated second programmed content, wherein the first programmed content is different from the second programmed content, and wherein the first synchronization signal is synchronized with the second synchronization signal; and
      switching the tuner back to the first ensemble to retrieve the associated first programmed content from the first ensemble.

5. The receiver of claim 4, wherein the first and second synchronization signals are narrowband signals.

6. A radio receiver that optimizes terrestrial signal acquisition, the receiver comprising:

a tuner coupled to an antenna to receive a terrestrial signal; and a processor coupled to a frequency synthesizer of the tuner, wherein the processor is programmed to perform the steps of:

determining whether a first synchronization signal is available from a first ensemble of the terrestrial signal, wherein the first ensemble has an associated first programmed content;

switching the tuner to a second ensemble of the terrestrial signal to acquire a second synchronization signal when the first synchronization signal is not available from the first ensemble, wherein the second ensemble has an associated second programmed content, wherein the first programmed content is different from the second programmed content, and wherein the first synchronization signal is synchronized with the second synchronization signal; and switching the tuner back to the first ensemble to retrieve the associated first programmed content from the first ensemble.

7. The receiver of claim 6, wherein the first and second synchronization signals are narrowband signals.

* * * * *